United States Patent
Petitdemange et al.

(10) Patent No.: US 9,423,618 B2
(45) Date of Patent: Aug. 23, 2016

(54) VIEWING DEVICE COMPRISING A COMBINER WITH VARIABLE REFLECTION FACTOR

(71) Applicant: THALES, Courbevoie (FR)

(72) Inventors: Arnaud Petitdemange, Blanquefort (FR); Sebastien Pelletier, Merignac (FR); Johanna Dominici, Eysines (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/664,772

(22) Filed: Mar. 20, 2015

(65) Prior Publication Data
US 2015/0268472 A1 Sep. 24, 2015

(30) Foreign Application Priority Data
Mar. 21, 2014 (FR) .................................... 14 00683

(51) Int. Cl.
*G02F 1/1334* (2006.01)
*G02B 27/01* (2006.01)

(52) U.S. Cl.
CPC ....... *G02B 27/0149* (2013.01); *G02B 27/0101* (2013.01); *G02F 1/1334* (2013.01); *G02B 2027/013* (2013.01); *G02B 2027/0118* (2013.01); *G02B 2027/0154* (2013.01); *G02B 2027/0194* (2013.01)

(58) Field of Classification Search
CPC .................................................... G02F 1/1334
See application file for complete search history.

(56) References Cited

U.S. PATENT DOCUMENTS

| | | | | |
|---|---|---|---|---|
| 6,100,943 A | * | 8/2000 | Koide | B60K 37/02 345/7 |
| 6,744,478 B1 | * | 6/2004 | Asakura | G02B 27/0101 349/11 |
| 6,864,927 B1 | * | 3/2005 | Cathey | G02B 27/01 349/11 |
| 6,947,013 B2 | * | 9/2005 | D'Achard Van Enschut | G02B 27/0101 345/6 |
| 7,034,778 B1 | * | 4/2006 | Hahl | G02B 27/01 345/7 |
| 8,902,130 B2 | * | 12/2014 | Furuya | G02B 5/32 345/7 |
| 2012/0242724 A1 | | 9/2012 | Kurozuka et al. | |

FOREIGN PATENT DOCUMENTS

| | | |
|---|---|---|
| EP | 1 158 336 A2 | 11/2001 |
| JP | 2008-209724 A | 9/2008 |
| KR | 2009-0116486 A | 11/2009 |
| WO | WO 02/086591 A1 | 10/2002 |
| WO | WO 2008/109231 A2 | 9/2008 |

OTHER PUBLICATIONS

French Search Report for corresponding French Application No. 1400683, 8 pages, (Dec. 12, 2014).

* cited by examiner

*Primary Examiner* — Timothy L Rude
(74) *Attorney, Agent, or Firm* — Blakely, Sokoloff, Taylor & Zafman LLP

(57) ABSTRACT

The general field of the invention is that of optical viewing systems comprising a display and a tilted optical plate arranged above this display and forming therewith substantially a dihedron. The system according to the invention comprises means for adjusting the reflection coefficient of the said tilted optical plate along an axis perpendicular to the axis of the dihedron and up to a variable height so as to ensure the total reflection of a first part of the image displayed by the display and the partial reflection of a second part of the image displayed by the display, complementary to the first part. The insertion of optical components between the display and the optical plate makes it possible to modify the distance of the display image reflected by the optical plate.

9 Claims, 3 Drawing Sheets

VIEWING DEVICE COMPRISING A COMBINER WITH VARIABLE REFLECTION FACTOR

BACKGROUND OF THE INVENTION

1. Technical Field of the Invention

The field of the invention is that of viewing devices intended to be mounted in vehicles and making it possible to display all or part of the information displayed on the exterior. The favoured field of applications is aeronautics where these viewing devices are mounted on aircraft instrument panels. However, this type of device can also be mounted on road or railway vehicles.

2. Description of the Prior Art

In a conventional manner, in an aircraft cockpit, when it is desired to display information on the exterior, a specific viewing device is dedicated to this function. This device, generally called "Head-Up" or "HUD", the acronym standing for "Head-Up Display", is totally separate from the so-called "Head-Down" viewing devices which currently consist of liquid-crystal flat screens. Generally, an HUD chiefly comprises an image source, a collimation optic and an optical mixer or "combiner". The collimated image is superimposed on the exterior by means of the optical mixer. Such an assembly combining "Head-Down" viewing units and "Head-Up" viewing units has several drawbacks. The first is of an ergonomic nature. The image of the screens on the instrument panel is at finite distance whereas the image of the collimated viewing units is at large distance. It is therefore very difficult to ensure continuity in the two images and, moreover, the observer must accommodate when he switches from one representation to another. However, the accommodation time is not negligible, having regard to the high speed of the carrier. The second drawback is of an economic nature. An "HUD" is an expensive optical device subject to specific production, installation and harmonization constraints.

SUMMARY OF THE INVENTION

The viewing device according to the invention does not have these various drawbacks. It comprises one single large viewing screen that is able to ensure by means of a single combiner with variable transmission both the viewing of information in the "Head-Down" position and also in the "Head-Up" position. More precisely, the subject of the invention is an optical viewing system comprising a display and a tilted optical plate arranged above this display and forming therewith substantially a dihedron, characterized in that the plate comprises a pluralities of zones, the system comprising means for adjusting the reflection coefficient of each zone so as to ensure the total reflection of a first part of the image displayed by the display and the partial reflection of a second part of the image displayed by the display, complementary to the first part.

Advantageously, the zones are disposed in such a way that, along an axis Z perpendicular to the axis of the dihedron and up to a variable height H, the optical plate is reflecting and beyond the said height H, the optical plate is partially reflecting.

Advantageously, the optical plate is a plate with plane and parallel faces or a curved plate or a plate comprising a curved part.

Advantageously, the system comprises an optical component operating by transmission and having a determined optical power, all or part of the said component being arranged above the said display, between the display and the optical plate.

Advantageously, the optical power of the optical component is fixed or the optical power of the optical component is variable, the said optical power being near-zero on the side of the axis of the dihedron.

Advantageously, the mean optical axis of the optical component is tilted with respect to the normal to the display.

Advantageously, the plate comprises a deposition of poly-dispersed liquid crystal whose reflection factor is variable as a function of an applied voltage.

Advantageously, the display is a liquid-crystal display.

BRIEF DESCRIPTION OF THE DRAWINGS

The invention will be better understood and other advantages will become apparent on reading the non-limiting description which follows and by virtue of the appended figures among which.

DETAILED DESCRIPTION OF THE INVENTION

Figure 1:
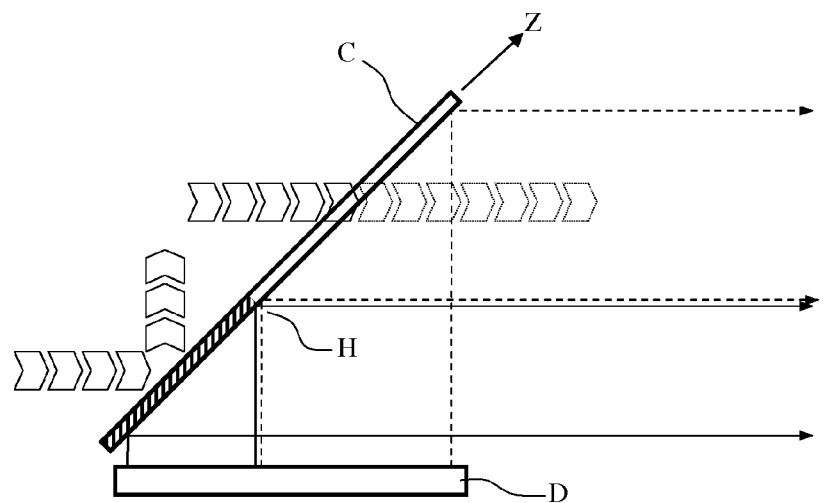
FIG. 1 represents a sectional view of an optical viewing system according to the invention.

By way of non-limiting example, FIG. 1 represents a sectional view of an optical viewing system according to the invention in its basic version. It essentially comprises a display D and a tilted optical plate C arranged above this display and forming therewith substantially a dihedron.

The system comprises means, not represented in FIG. 1, of adjustment of the reflection coefficient of the said optical plate. These means make it possible to adjust both the reflection factor and also the reflecting parts of the plate. Generally, the variation of the reflection coefficient is effected along an axis Z perpendicular to the axis of the dihedron up to a likewise variable height H so as to ensure the total reflection of a first part of the image displayed by the display and the partial reflection of a second part of the image displayed by the display, complementary to the first part.

In FIG. 1 and the following figures, the purely reflective part of the plate is represented by hatched lines. The chevrons in FIG. 1 represent the light coming from the exterior. Said light is totally reflected by the bottom part of the plate C and partially transmitted by the top part of the plate C. The partial transmission is symbolized by dotted chevrons. The arrows represent the light coming from the display. Said light is totally reflected by the bottom part of the plate C and partially reflected by the top part of the plate C. The distribution of the reflecting and semi-reflecting zones may be different as a function of the use of the optical system.

The display D used is conventionally a flat-screen display. It can consist of a backlit liquid-crystal screen. Lighting can be ensured by light-emitting diodes which make it possible to ensure compact, robust and reliable powerful lighting. The spectrum emitted is also easily adaptable.

The plate C is a thin plate whose optical power in transmission is zero or near-zero so as not to disturb the view of the exterior landscape. The mean angle of tilt of this plate with respect to the plane of the display is greater than or equal to 45 degrees. The minimum distance between the plate and the display does not exceed a few centimetres.

To ensure the variation of reflectivity of the optical plate, it is possible to use a deposition of reflecting poly-dispersed liquid crystal, also known by the acronym "PDLC". This type of material is electrically actuatable and its reflection factor depends on the voltage which is applied to it via a transparent electrode. Depositions based on ITO, which is an indium tin oxide, make it possible to produce this type of electrode. It is possible, on the basis of matrixed transparent electrodes, to actuate only certain zones of the plate as a function of specific display surfaces.

Figure 2:
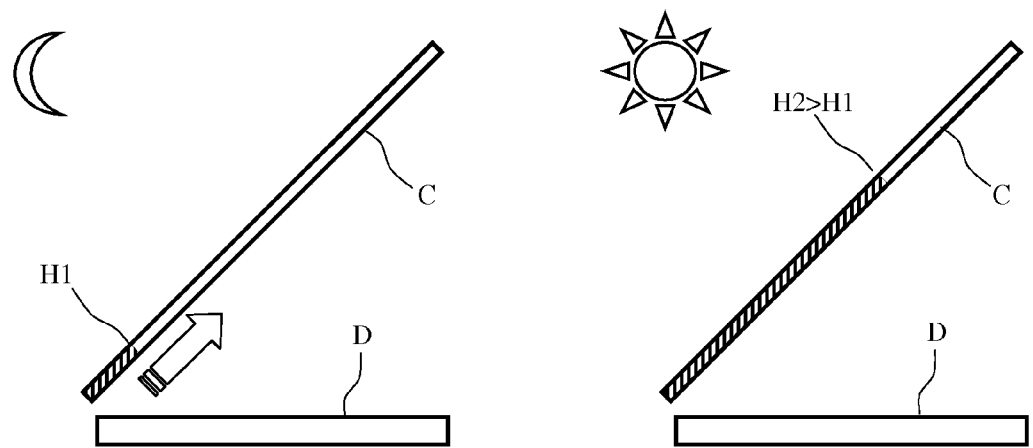
FIG. 2 represents the operating principle of an optical viewing system according to the invention.

This arrangement makes it possible to tailor in real time the dimensions and also the reflection coefficients of the so-called "head-up" and "head-down" zones. The contrast of the display against an ambient light background is thus optimized. By increasing the reflectivity of the top part of the plate, the contrast displayed is doubly favoured by reducing the exterior light and by increasing the perceived brightness of the display screen. In the case of strong ambient light, it is possible to mask the exterior totally. In this case, the totality of the display is equivalent to a "Head-down" viewing screen. FIG. 2 illustrates this principle. In the case of weak illumination, the height H1 of strong reflectivity of the plate is small. In the case of strong illumination, the height H2 of strong reflectivity of the plate is considerable.

Figure 3:
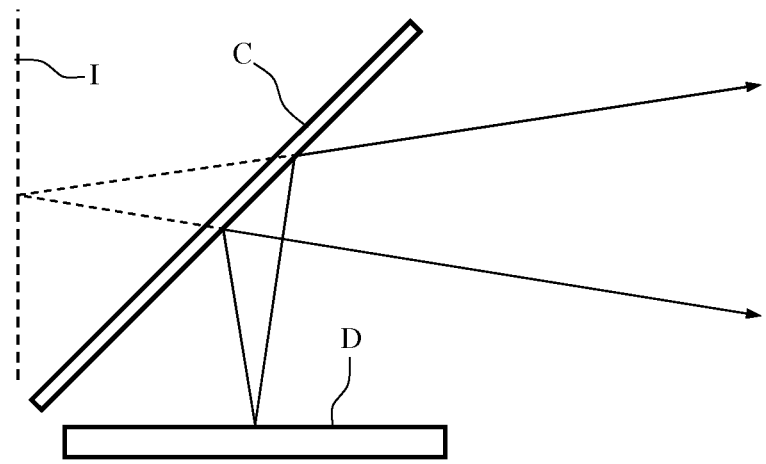
FIG. 3 represents the image of the display in an optical viewing system according to the invention comprising a plane optical plate.

The image I of the display D is obtained by reflection on the optical plate C. If the plate C is conventionally a plate with plane and parallel faces, this image is a plane image situated at a certain distance from the user that is easily calculable. This image I is represented by dots in FIG. 3. It is known that the top part of the image is superimposed on the exterior which is necessarily situated a long distance away. It is thus beneficial that at least the top part of the image be situated at a larger distance from the user than that determined by a plane plate. To obtain this effect, various technical solutions are possible. By way of examples, FIGS. 4, 5 and 6 illustrate three possible technical solutions.

Figure 4:
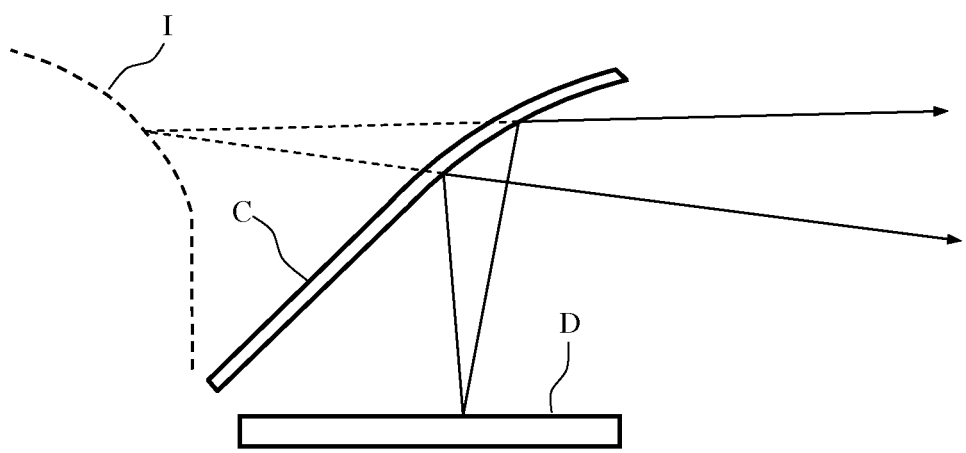
FIG. 4 represents the image of the display in an optical viewing system according to the invention comprising a curved optical plate.

The first solution is illustrated in FIG. 4. In this solution, the optical plate is a curved plate or a plate comprising a curved part. This curved part can be spherical, cylindrical or aspherical. The reflected image is thus moved further away from the user, as seen in FIG. 4.

Figure 5:
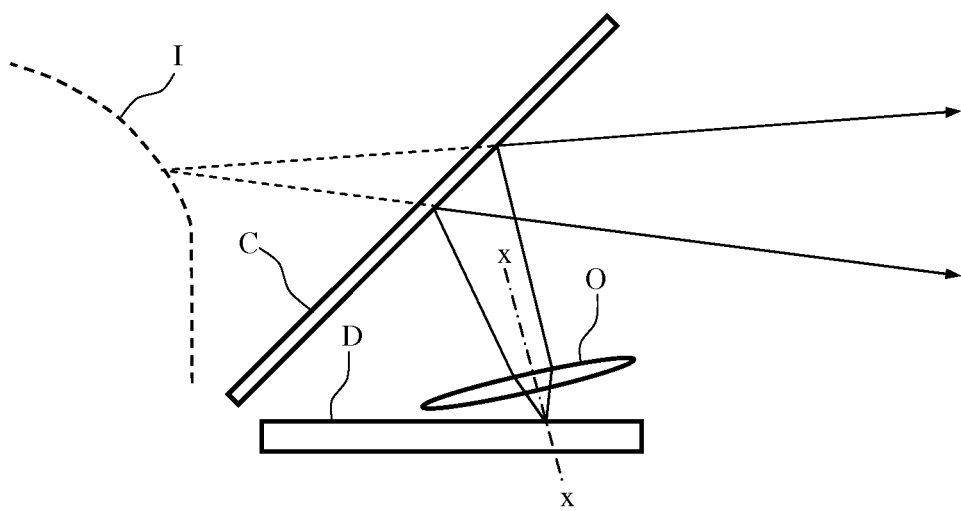
FIG. 5 represents the image of the display in an optical viewing system according to the invention comprising a first optical component.
Figure 6:
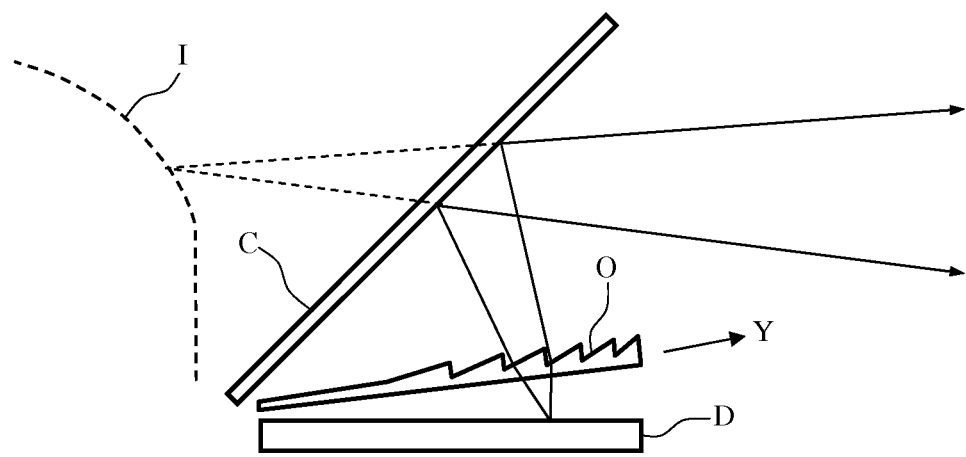
FIG. 6 represents the image of the display in an optical viewing system according to the invention comprising a second optical component.

The second solution is illustrated in FIG. 5. It consists in interposing an optical component O operating by transmission and having a determined optical power, all or part of the said component being arranged above the said display, between the display and the optical plate. The optical axis x-x of the optical component O is tilted with respect to the normal to the display.

This optical component O can be a simple lens, an optical doublet or a more complex optical component. The shape of this component is adapted to suit the format of the zone of the display further away from which it is desired to move the image. The optical power, the angle of tilt of the optical axis and the distance of the optical component from the display are calculated as a function of the amount by which it is desired to move the image further away.

In a variant embodiment represented in FIG. 6, the optical component covers the totality of the surface of the display. Its optical power is variable along an axis Y arranged in the plane of the optical component and perpendicular to the axis of the dihedron. It is nearly zero in the vicinity of the dihedron and increases progressively as a function of the desired amount by which the image is moved further away. This optical power variation can be obtained using a Fresnel lens with variable focal length, as illustrated in a schematic manner in FIG. 6 by more or less pronounced sawteeth. It is also possible to use a lens one of whose surfaces has a profile with variable radius of curvature or whose optical index is variable.

These various optical solutions can cause image distortions. They can be very easily compensated for by introducing an inverse distortion on the image provided by the display.

What is claimed is:

1. Optical viewing system comprising a display and a tilted optical plate arranged above this display and forming therewith substantially a dihedron, in which the plate comprises a pluralities of zones, the system comprising means for adjusting the reflection coefficient of each zone so as to ensure the total reflection of a first part of the image displayed by the display and the partial reflection of a second part of the image displayed by the display, complementary to the first part, the zones being disposed in such a way that, along an axis perpendicular to the axis of the dihedron and up to a continuously variable height, the optical plate is reflecting and beyond the said height, the optical plate is partially reflecting.

2. Optical viewing system according to claim 1, in which the optical plate is a plate with plane and parallel faces.

3. Optical viewing system according to claim 1, in which the optical plate is a curved plate or a plate comprising a curved part.

4. Optical viewing system according to claim 2, in which the system comprises an optical component operating by transmission and having a determined optical power, all or part of the said component being arranged above the said display, between the display and the optical plate.

5. Optical viewing system according to claim 4, in which the optical power of the optical component is fixed.

6. Optical viewing system according to claim 4, in which the optical power of the optical component is variable, the said optical power being near-zero on the side of the axis of the dihedron.

7. Optical viewing system according to claim 4, in which the mean optical axis of the optical component is tilted with respect to the normal to the display.

8. Optical viewing system according to claim 1, in which the plate comprises a deposition of poly-dispersed liquid crystal whose reflection factor is variable as a function of an applied voltage.

9. Optical viewing system according to claim 1, in which the display is a liquid-crystal display.

* * * * *